United States Patent [19]

Ritcey et al.

[11] 4,362,607
[45] Dec. 7, 1982

[54] RECOVERY OF COPPER AND ZINC FROM COMPLEX CHLORIDE SOLUTIONS

[75] Inventors: Gordon M. Ritcey, Nepean; Kenneth T. Price, Ottawa; Bernard H. Lucas, Nepean, all of Canada

[73] Assignee: Canadian Patents and Development Limited, Ottawa, Canada

[21] Appl. No.: 284,580

[22] Filed: Jul. 17, 1981

[30] Foreign Application Priority Data

Jul. 29, 1980 [CA] Canada .................................. 358800

[51] Int. Cl.$^3$ .......................... C25C 1/12; C25C 1/16; C25C 1/18
[52] U.S. Cl. ..................................... 204/108; 204/117; 204/118; 75/92; 75/101 BE; 75/114
[58] Field of Search ............... 204/108, 117, 118, 130; 75/101 BE, 114, 92

[56] References Cited

U.S. PATENT DOCUMENTS

| | | | |
|---|---|---|---|
| 3,969,106 | 7/1976 | Wark | 75/101 BE |
| 4,054,516 | 10/1977 | Izumi et al. | 75/101 BE |
| 4,194,905 | 3/1980 | Gallacher | 75/101 BE |

*Primary Examiner*—R. L. Andrews
*Attorney, Agent, or Firm*—Alan A. Thomson

[57] ABSTRACT

The solvent extraction separation and recovery of copper and zinc from complex chloride liquors; e.g. those resulting from the low temperature chlorination and leach of a copper-lead-zinc sulphide ore or concentrate; are described, including the selection of sequence, conditions, extractants, scrubbing and stripping media and adaptations for electrowinning and recycle. High purity copper sulphate and zinc chloride electrolytes are produced for subsequent direct electrowinning. Lead may also be recovered.

16 Claims, 3 Drawing Figures

SCHEMATIC OF OVERALL PROCESS
FOR TREATMENT OF Pb/Zn CONCENTRATES

ZINC RECOVERY CIRCUIT

RECOVERY OF COPPER AND ZINC FROM COMPLEX CHLORIDE SOLUTIONS

This invention is concerned with the extraction and recovery of copper and zinc from aqueous chloride liquors such as leach liquors obtained from a chlorination roast-leach of copper-lead-zinc sulphide ores or concentrates. A particular sequence of steps has been developed for the separation of copper and zinc from chloride solutions and their recovery.

The conventional refining of zinc usually comprises a hydrometallurgical route, alone or in combination with pyrometallurgy. Roasted concentrates are dissolved with dilute sulphuric acid to produce a solution containing zinc sulphate plus impurities. After a series of process steps to remove the impurities, the zinc is recovered by electrolysis, and the depleted zinc sulphate solution and regenerated sulphuric acid are returned to the leaching step. However, due to their mineralogy, some of the fine-grained, complex, zinc-bearing ores do not respond to the production of concentrates. Such complex sphalerite ores are to be found in large quantity in countries such as Canada, Australia and Norway. Differential flotation is relatively unsuccessful, and only at considerable loss of values.

Throughout Canada, there are many known deposits of zinc sulphides, mainly fine-grained sphalerite and galena, which are difficult to process by differential flotation for separation and recovery. Indeed, in treating the New Brunswick area ores, the present technology recovers only about 65% of the values by such means. Not only is there an economic loss to the plant, but the tailings, containing significant amounts of sulphides, oxidize and produce acid which continues to leach the remaining base metals. Thus an environmental problem is also created. At one New Brunswick location, for example, the total proven and probable reserves approximate 120 million tons averaging 9% Zn, 0.5% Pb, 1% Cu and 2 oz/ton Ag. Like McArthur River deposits in Australia, and such deposits elsewhere, much research has been devoted in the past to maximize metals recovery from the New Brunswick ores, and like the other ores, without much apparent success.

Present technology for treating such complex lead-copper-zinc sulphide ores includes a hydrometallurgical approach of leaching ores or concentrates in sulphuric acid. Following such leaching, the solution is purified by many step-wise operations involving precipitation and cementation, until finally a purified zinc solution is produced which is amenable to electrolysis for zinc cathode recovery. A variation of the conventional hydrometallurgical leaching route is a roast-leach process, followed by stage-wise purification steps. The limitation of the hydrometallurgical route or the roast-leach route is the number of process steps required to obtain a pure zinc product. Also, the tailings still contain sulphides and create environmental problems. In addition, conventional technology does not provide for the recovery of high-purity by-products.

Some investigations have been made of solvent extraction of various metals including zinc or copper from relatively simple chloride solutions. In the literature, tributylphosphate has been tested as extractant in separating zinc from impurities such as cadmium in chloride systems. Other extractants have been tested to extract zinc from chloride systems including carboxylic acids such as naphthenic acid, and Versatic 911 (trademark); primary and secondary amines; di-2-ethylhexylphosphoric acid; and mixtures of a substituted quinoline extractant (e.g. Kelex 100-trademark) and a carboxylic acid extractant (e.g. Versatic 911).

In the Espindesa process for treating solutions resulting from roasting and leaching of a pyrite cinder, a secondary amine extractant was used for zinc from chloride solution, followed by scrubbing, then water stripping and re-extracting with D2EHPA.

Some investigations have been reported on copper extraction from crude ferric chloride solution. A pilot process for treating sulphide concentrates used an oxime reagent LIX 64N (trademark-Hankel) for copper extraction (see J. C. Paynter, J. South African I.M.M., November 1973, pp. 158-170). In the Minimet process operating on sulphide ores and concentrates (see J. M. Demarthe, L. Gandon and A. Georgeaux, in Extractive Metallurgy of Copper-Hydrometallurgy and Electrowinning, Vol. 2, Proceedings of International Symposium, 1976, AIME, Pub. Port City Press, Baltimore, U.S.A., pp. 825-848) copper, from a cupric chloride leach, is extracted with LIX 65N, chloride is removed by water or $CuSO_4$ solution scrubbing, and stripping is accomplished with spent electrolyte from conventional electrowinning of copper sulphate solution.

Thus while some solvent extraction operations on certain specific chloride solutions have been reported, the extraction of complex copper-zinc-lead, etc., liquors such as would result from the chlorination-leach of complex galena-sphalerite-chalcopyrite ores, and recovery of metals, has not been dealt with. It would be desirable to develop a fully integrated chlorination-solvent extraction-electrowinning process able to handle such complex ores.

Summary of the Invention

An integrated process has been developed for extracting copper and zinc from aqueous chloride solutions containing lead, copper, zinc and impurities, comprising (a) separating lead from the aqueous chloride solution by at least one of crystallization, precipitation and solvent extraction;

(b) solvent extracting the resulting aqueous solution with a first water-immiscible organic liquid comprising a copper-chelating extractant reagent to load copper into the organic phase;

(c) scrubbing the Cu-loaded organic phase with at least one aqueous liquid selected from water and $Na_2SO_4$ solution to remove impurities;

(d) stripping the Cu from this first organic phase with aqueous $CuSO_4$-$H_2SO_4$ solution and passing the Cu-containing sulphate strip solution to a Cu electrowinning stage;

(e) scrubbing this stripped organic phase with water to remove sulphate, and recycling this first organic liquid to extraction stage (b);

(f) solvent extracting the remaining aqueous chloride solution with a second water-immiscible organic liquid comprising tributylphosphate to load zinc thereon;

(g) scrubbing the Zn-loaded organic phase with aqueous $ZnCl_2$-NaCl solution to remove impurities;

(h) stripping the Zn from this second organic phase with aqueous $ZnCl_2$-HCl solution and passing the Zn-containing chloride strip solution to a Zn electrowinning stage; and (i) separating impurities from the residual aqueous phase sufficiently to avoid detrimental build-up thereof, and recovering chloride solution for recycle.

As an example of a preferred overall process, sulphide ore or concentrate containing copper, zinc, lead and iron, is fed to a furnace where the material is chlorinated at a temperature within about 300°–700° C. Next, under an oxidizing atmosphere, at about 425°–475° C., some iron is volatilized as gaseous $FeCl_3$ while the remainder is converted to $Fe_2O_3$. In the following brine leaching stage, essentially all the iron ($Fe_2O_3$) remains insoluble with the residue. After hot filtration, the leach liquor is allowed to cool to crystallize $PbCl_2$ from solution. The resultant supernatent liquor, which is then fed to solvent extraction, usually contains zinc in about 20 to about 40 g/L
copper in about 0.1 to about 2 g/L
lead in about 0.1 to about 2 g/L
iron-less than about 0.1 g/L and other minor impurities, about 2–4 M (preferably 3 M) in NaCl at a pH with about 1 to 5 (preferably 2–4). The copper and zinc are recovered by solvent extraction sequentially, as discussed in detail below, yielding separate copper and zinc solutions for electrowinning, and the final raffinate is returned to the leach circuit after removing and treating a bleed stream to avoid detrimental impurity build-up. The lead chloride may be recovered as high purity lead, preferably by fused salt electrolysis with chlorine being recycled.

DESCRIPTION OF THE DRAWINGS

The FIG. 1 drawing is a flowsheet of the overall process for the treatment of Pb/Cu/Zn materials.

DETAILED DESCRIPTION

Figure 1:
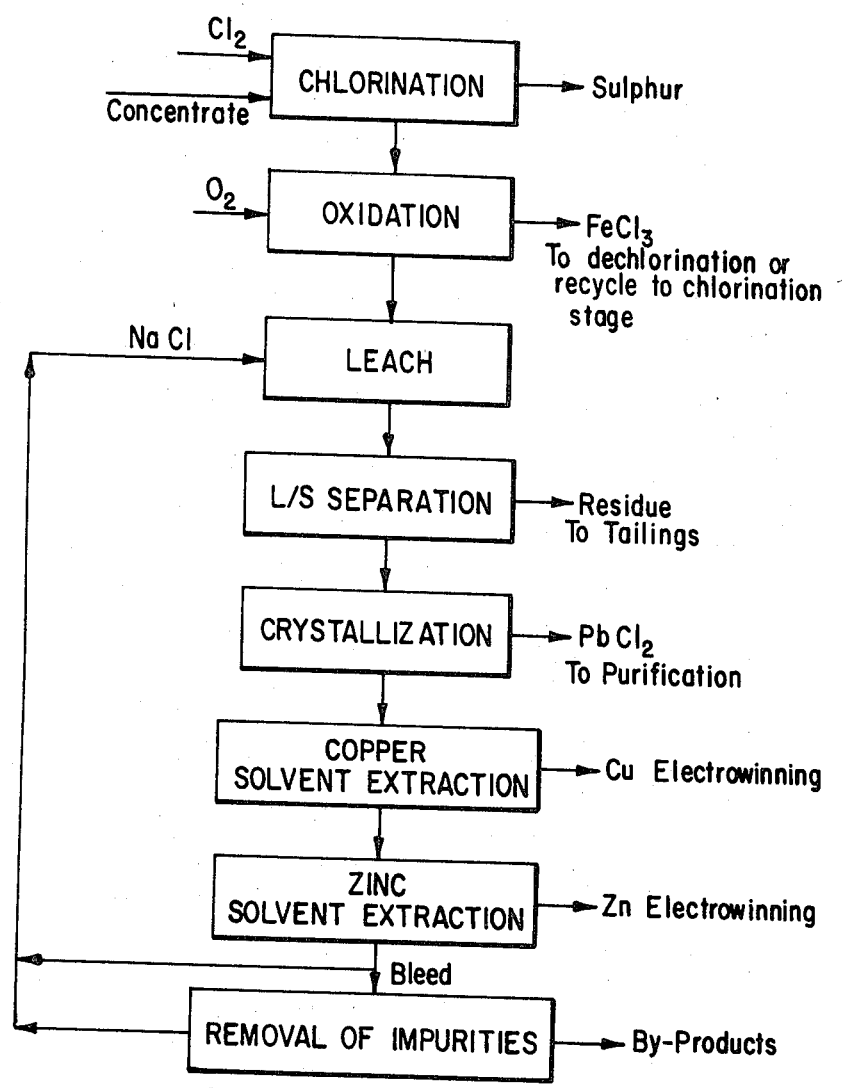

The process can operate on any chloride solution containing lead, copper, and zinc. Frequently, this feed solution can be derived from ores, concentrates, mattes or tailings, particularly sulphides, by a chlorination roast, oxidation of any iron, and a leach. The chlorinated calcine is leached in an aqueous acidic media, most suitably a brine media having a salt concentration equivalent to about 2–4 M NaCl at a pH of about 1 to 5 (preferably 3 M NaCl at pH 2–4). Such a leach liquor may contain zinc in about 20 to about 40 g/L
lead in about 6 to about 10 g/L
copper in about 0.1 to about 2 g/L
iron in leass than about 0.2 g/L and other impurities such as Cd, Bi, Ag, etc. The solid residue would be discarded as tailings or treated for further recovery of iron, gold, silver, etc. Suitable chloride solutions can be derived from other materials and by other routes.

Lead is separated from the chloride solution by at least one step selected from: crystallization of lead chloride; precipitation, e.g. as $PbSO_4$; or by solvent extraction, e.g. preferably utilizing quaternary amine extraction reagents. The preferred route to lead metal recovery is by fused salt electrolysis of lead chloride crystals.

COPPER EXTRACTION

After removal of substantially all of the lead, the chloride liquor is extracted to remove copper. A copper-chelating extractant reagent in a suitable organic solvent is used. Many tests were carried out to select the most suitable extraction reagent considering equilibrium Cu distribution, kinetics, metal discrimination, scrubbing and stripping, and rate of phase separation. While other reagents gave satisfactory performance, our test results indicated that oxime-type copper-chelating reagents would be most suitable with alkyl-substituted salicylaldoxime reagents preferred. One preferred salicylaldoxime has the formula:

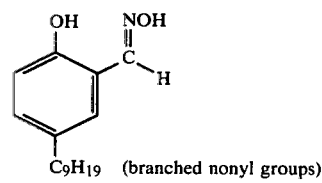

$C_9H_{19}$ (branched nonyl groups)

These oximes are dissolved in a water-immiscible diluent such as liquid hydrocarbons. Other oxime-type copper-chelating extraction reagents which may be used include SME529 (Shell-trademark) and LIX 65N, the choice depending upon chloride concentration and pH. The amount of Cu reagent dissolved in the total solvent or diluent is normally within about 1 to 10% by volume.

It has been found necessary to scrub the copper-loaded organic phase to remove chloride impurity. Chloride removal is required to convert to a sulphate system amenable to conventional electrowinning. Water itself or sodium sulphate solution are suitable scrub liquids. Room temperature was found more effective than 50° C. for scrubbing chloride. Stripping of copper from the organic is accomplished by a sulphuric acid solution containing some copper (as $CuSO_4$). A preferred strip solution contains about 25–35 g Cu/L and about 120–180 g $H_2SO_4$/L, usually about 30 Cu/L and 150 g $H_2SO_4$/L. A sulphate return electrolyte from the Cu electrowinning is a very suitable stripping medium.

After stripping the loaded solvent with the acidified $CuSO_4$ solution, the stripped solvent phase would be recycled to the Cu extraction. With continual recycle, some sulphate may be released into the chloride feed liquor. Scrubbing with water (e.g. at O/A of 5/1 and room temperature) was found most effective for sulphate removal from the stripped solvent phase. After 500 cycles through extraction-stripping of a salicylaldoxime reagent in a hydrocarbon diluent, no evidence of reagent degradation was evident and solvent losses were minimal (<0.25 ppm of salicylaldoxime reported in aqueous chloride solution).

ZINC EXTRACTION

The residual aqueous chloride liquor (Cu raffinate) is next solvent-extracted to remove zinc. We have found TBP (tributylphosphate) to be a preferred zinc extraction reagent due to the ease of stripping therefrom. The TBP will be diluted with a water-immiscible solvent such as hydrocarbon liquids, e.g. aliphatic such as kerosene or aromatic such as toluene. Most suitably, the amount of TBP in the organic phase will be within about 30 to about 80% by wt., preferably about 60% if treating high zinc liquors. It has been found desirable to pre-equilibrate the TBP-solvent phase with aqueous HCl. Tests have shown no evidence of significant TBP loss or degradation with continual use (500 cycles).

The zinc-loaded organic phase is scrubbed to remove impurities such as copper and lead. A scrub solution of $ZnCl_2$-NaCl in water was found preferred in removing extracted Cu and Pb yet without loss of zinc. The Zn preferably ranges from about 15 to 40 g Zn/L and the NaCl from about 120 to 200 g NaCl/L. One preferred scrub solution is about 25 g Zn/L in 3 M NaCl at pH 3.5–4.

Zinc is stripped from the organic phase with an aqueous $ZnCl_2$-HCl solution, preferably having about 10–20 g Zn/L in HCl at pH about 1. About 10 to 20 g HCl/L is a suitable range. The stripped solvent will still contain about 1–1.5 g Zn/L and will be recycled to Zn extraction without further scrubbing.

The residual chloride liquor phase (Zn raffinate) usually is recycled to an initial leach stage. It may be necessary to purify part of this residual liquor to avoid build-up of impurities such as Cd, Bi, etc. Purification steps which may be used include ion exchange, and precipitation, preferably to remove substantially all cations and anions other than chloride.

The following Example is illustrative.

A sulphide ore concentrate, having the analysis shown in Table 1, was fed to a furnace where it was chlorinated at about 375° C.

TABLE 1

| Analysis of Ore and Concentrate (%) | | |
|---|---|---|
| Analysis | Ore | Concentrate |
| Zn | 9.02 | 29.9 |
| Cu | 0.42 | 0.74 |
| Pb | 3.15 | 9.48 |
| Fe | 31.7 | 19.9 |
| S | 37.9 | 36.6 |
| SiO | | 0.22 |
| $Ag^{+2}$ | 118* | 270* |

*g/tonne

Elemental sulphur was condensed and recovered as a byproduct. The chlorinated material was transported to a second furnace, where, under an oxidizing atmosphere at 450° C., some iron was volatilized as $FeCl_3$ while the remainder was converted to $Fe_2O_3$. The resulting calcine was leached with brine (concentration about 3 M NaCl) while hot, and hot filtration carried out. The leach solution (filtrate) had the approximate analysis in g/L 28.5 Zn, 0.4 Cu, 8.5 Pb, <0.1 Fe, 3 M NaCl and pH about 4.

On cooling the leach solution, $PbCl_2$ crystallized out lowering the level of Pb in the supernatent to about 0.4 g/L. No further lead removal step was considered necessary and after filtering off the $PbCl_2$, the leach solution was fed to the Cu extraction.

Continuous Cu extraction was run in a series of stagewise mixer settlers of 620 mL capacity. The extractant was 5% by vol. of the salicylaldoxime type Acorga P5300 (trademark-Acorga Ltd.) extractant in Shell 140 (trademark) hydrocarbon solvent. It is understood that this P5300 extractant contains about 25% by wt. of the anti-isomer of 5-nonyl salicylaldoxime and about 72% p-nonylphenol. The residence time in each mixer was 0.5 minutes and an A/O ratio of 3.5 was used (311 mL aqueous, 89 mL organic). Typical results for a 2 to 4-stage run are shown in Table 2, indicating good extraction of copper and increasing discrimination over zinc, lead and iron with an increasing number of stages.

Scrubbing was carried out at room temperature using both $Na_2SO_4$ and water as the scrub solutions, as indicated by the earlier bench-scale tests. Scrubbing was performed at an O/A of 5/1, (300 mL organic, 60 mL aqueous) in 6 stages. The scrubbed solvent was stripped in 3 stages, O/A 6/1, using a strip solution containing 28.7 g Cu/L in 150 g $H_2SO_4$/L. The results of scrubbing and subsequent stripping at room temperature, shown in Table 3, indicate that water was as effective as $Na_2SO_4$ for scrubbing of chloride, and that a relatively high purity of copper strip feed to electrowinning resulted. Narrower dispersion bands and, therefore, better coalescence rates were achieved with the water scrub solution. A residual amount of approximately 0.7 g Cu/L remained on the stripped solvent in equilibrium with the stripping copper sulphate solution. This residual amount could be removed, if desired, by stripping with a solution containing 150 g $H_2SO_4$/L, to produce a stripped solvent containing about 0.01 g Cu/L, but at an extra cost. Prior to recycling the stripped solvent to Cu extraction, the solvent was scrubbed with water to remove any sulphate present. The loaded strip solution was fed to an electrolysis stage and Cu electrowon as described below.

The raffinate from the copper circuit, fed to a six-stage zinc extraction circuit, contained 28.5 g Zn/L, 0.016 g Cu/L, 0.40 g Pb/L, 0.003 g Fe as $Fe^{+3}$/L, 3.0 M NaCl at pH 1.39. The extractant was 60% TBP is Solvesso 150 (trademark) hydrocarbon diluent, pre-equilibrated with 50 g HCl/L at O/A 5/1. Extraction was at ambient temperature at an O/A 2.1/1 (237 mL/min solvent, 113 mL/min aqueous) in 6 stages to obtain a loading of 13.6 g Zn/L. The retention time in each mixer was 1.8 minutes. Following extraction, the loaded solvent was stripped in 6 stages at ambient temperature and O/A 2.5/1 using 15 g Zn/L at pH 1.0 (HCl). No scrubbing was attempted in the initial zinc circuits, but subsequently, following a series of electrowinning studies, scrubbing stages were added.

TABLE 2

| Copper Extraction Circuit - Extractant 5% P5300 in Shell 140 | | | | | | | |
|---|---|---|---|---|---|---|---|
| | | Extraction | | | Discrimination in Loading | | |
| Stage No. | Equil. pH | Raffinate Cu | Solvent Cu | % Cu Ext'd | Cu/ Zn | Cu/ Pb | Cu/ Fe |
| 2 | 1.29 | 0.013 | 1.33 | 96.3 | 1700 | 1320 | 1500 |
| 3 | 1.30 | 0.004 | 1.36 | 98.8 | 2300 | 1360 | 1900 |
| 4 | 1.29 | 0.002 | 1.40 | 99.8 | 3500 | 1400 | 2300 |

TABLE 3

| | | Scrubbing of Organic for Chloride Removal (6 Stages) | | | | | | | | | | |
|---|---|---|---|---|---|---|---|---|---|---|---|---|
| | | Scrub Solution | Stripped Solvent | | Loaded Strip Solution | | | | | | | |
| Scrub Solution | Equil. pH | Analysis $Cl^-$ | Cu (g/L) | $Cl^-$ ppm | Cu g/L | Free Acid g/L | Cl ppm | Zn ppm | Pb ppm | Fe ppm | Purity in Strip Cu/Zn | Cu/Pb | Cu/Fe |
| 50 g/L $Na_2SO_4$ | 4.2 | 44 ppm | 0.73 | 10 | 39.3 | 129 | 12.4 | 6 | 1 | 60 | 6550 | 39000 | 6500 |

TABLE 3-continued

| | | Scrubbing of Organic for Chloride Removal (6 Stages) | | | | | | | | | | |
|---|---|---|---|---|---|---|---|---|---|---|---|---|
| | | Scrub Solution | Stripped Solvent | | Loaded Strip Solution | | | | | | | |
| Scrub Solution | Equil. pH | Analysis Cl− | Cu (g/L) | Cl− ppm | Cu g/L | Free Acid g/L | Cl ppm | Zn ppm | Pb ppm | Fe ppm | Purity in Strip | | |
| | | | | | | | | | | | Cu/Zn | Cu/Pb | Cu/Fe |
| Water | 4.17 | 33 | 0.67 | 10 | 40.3 | 129 | 16 | 5 | 5 | 95 | 8000 | 8000 | 425 |

The results for the extraction and stripping circuits are shown in Tables 4 and 5. A residual value of about 2.4 g Zn/L remained in the solvent after stripping. In spite of the fact that no scrub stages were included, the purity of the aqueous strip solution with respect to Pb, Fe and Cu was reasonably good as is shown in Table 6. Scrubbing would have improved the Zn purity in the loaded strip solution shown in Table 6, and is recommended.

Smooth, compact copper deposits were electrowon at 35° C. and 269 A/m² (25 A/ft²) current density from the strip electrolytes (Table 3) using 10 mg/L Jaguar C13 (trademark of Stein, Hall & Co. for a HMW guar gum derivative) as the addition agent to promote smooth copper deposition. The current efficiency for the 26 h deposits was 98–99%. These results are in good agreement with those obtained for copper electrowinning from simulated electrolytes.

Smooth, compact, dendrite-free, 24 h zinc deposits were electrowon at 35° C. and 323 A/m² (30 A/ft²) from a zinc strip electrolyte (38.7 g Zn/L and impurities, in ppm, of 10 Pb, 0.5 Cu, 0.06 Cd, 0.1 Co, 0.6 Fe, 0.1 Ni, <0.1 As, <5 Sb) using a diaphragm cell with electrolyte circulation (by air-sparging) and with 15 mg/L tetrabutyl-ammonium chloride as the addition agent. The current efficiency of 88.9% was improved to 96.2% when the electrolyte was treated with activated carbon prior to electrowinning the zinc. The activated carbon treatment, which removed entrained organic matter from the electrolyte, also improved the quality of the zinc deposits.

Figure 2:
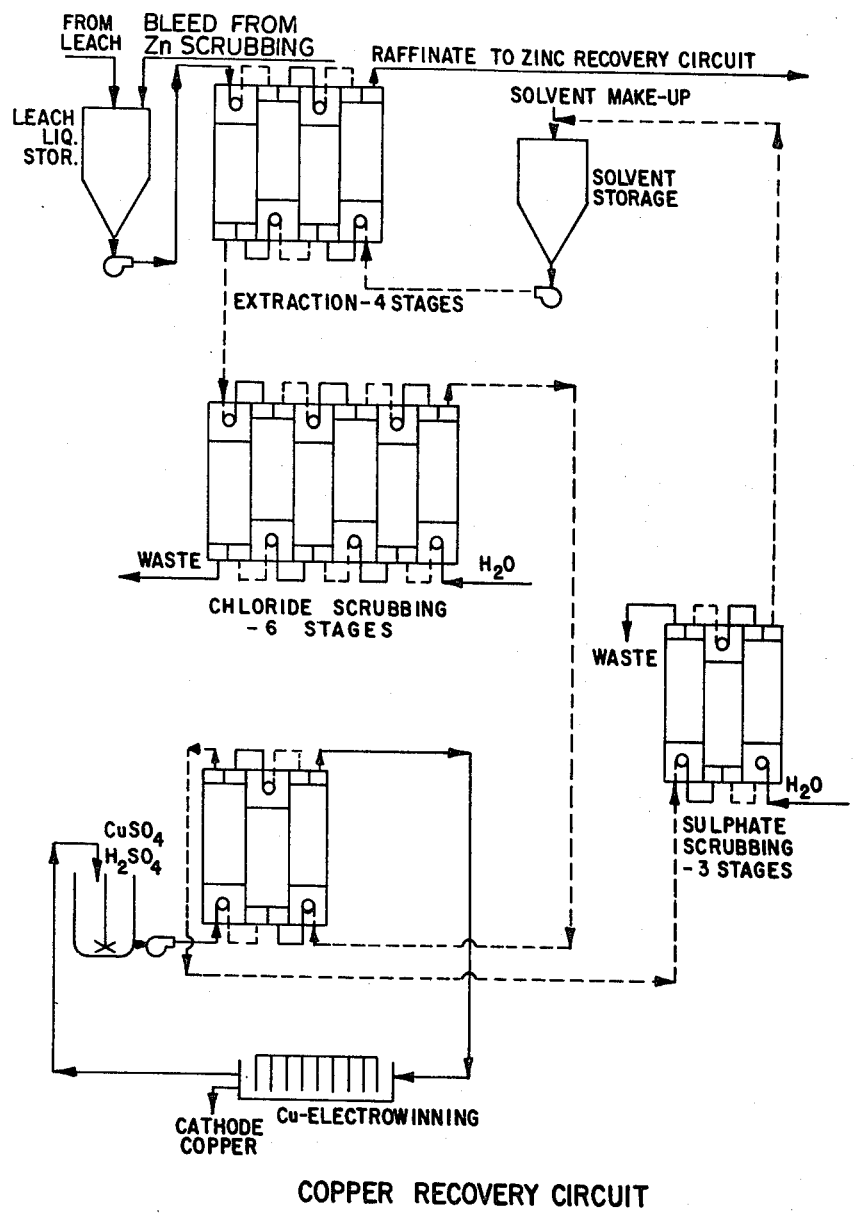
FIG. 2 is a diagram of a preferred solvent extraction copper recovery circuit showing number of stages and recycle features.
Figure 3:
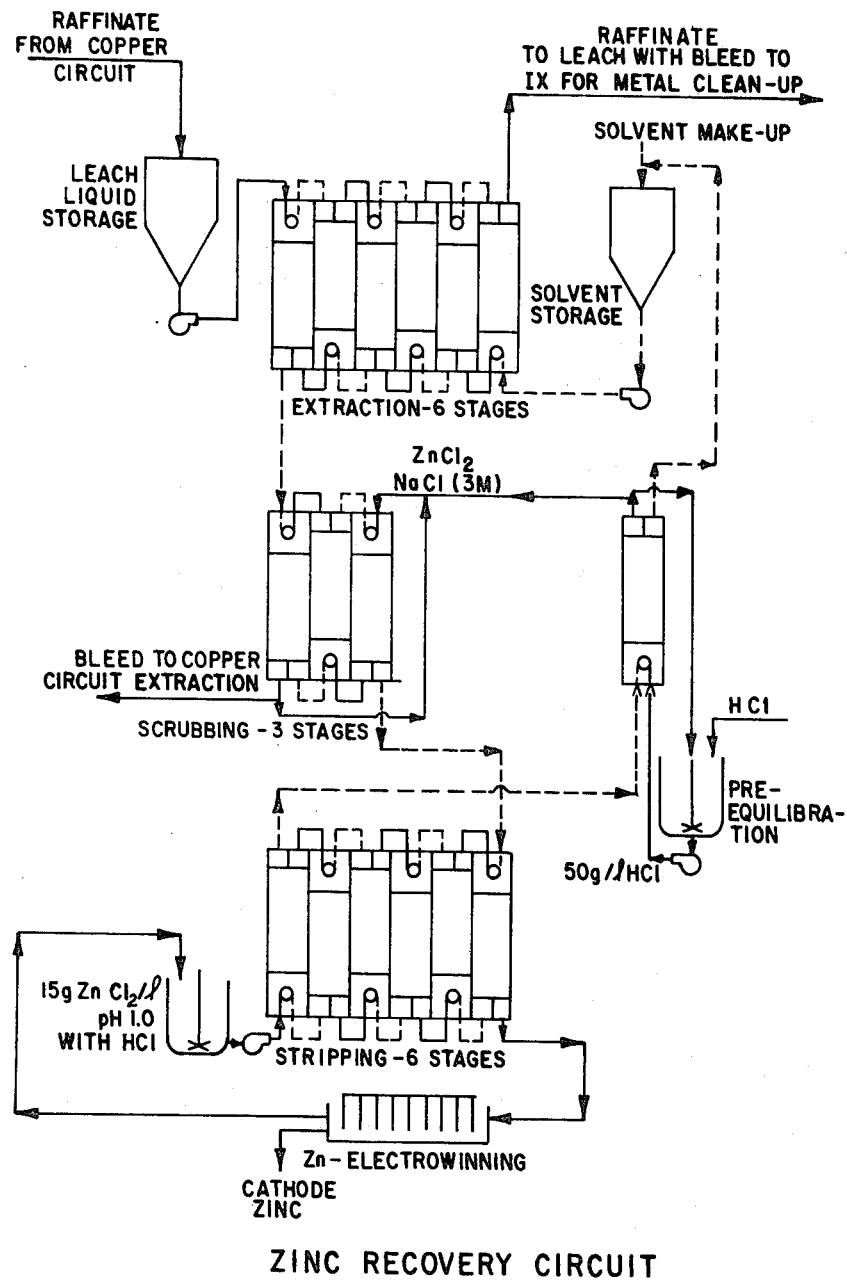
FIG. 3 is a similar diagram of a preferred solvent extraction zinc recovery circuit.

As a result of our tests, both bench scale and pilot plant, the flowsheets shown in FIGS. 2 and 3 have been developed for Cu and Zn recovery circuits in a commercial-scale plant.

TABLE 4

| Zinc Extraction Circuit - 60% TBP In Solvesso 150 | | | | | | | | |
|---|---|---|---|---|---|---|---|---|
| Feed | | Raffinate | | | | | | Extraction (%) |
| Zn (g/L) | pH | Zn (g/L) | pH | Loaded Solvent (g/L) | | | | Zn |
| | | | | Zn | Pb | Fe | Cu | |
| 28.5 | 1.39 | 2.05 | 1.0 | 12.6 | .005 | .0005 | .0002 | 92.8 |

TABLE 5

| Zinc Stripping Circuit | | | | | | | |
|---|---|---|---|---|---|---|---|
| Strip Feed | | Stripped Solvent (g/L) | | | Loaded Strip (g/L) | | |
| Zn (g/L) | pH | | | | | | |
| | Feed | Equil. | Zn | Pb | Fe | Zn | Pb | Fe |
| 15 | 1.0 | 0.83 | 2.35 | .001 | .0009 | 39.5 | 0.010 | 0.0007 |

TABLE 6

| Purity in Extraction and Stripping Circuits | | | |
|---|---|---|---|
| | Zn/Pb | Zn/Fe | Zn/Cu |
| Loaded Solvent | 2,480 | 24,800 | 62,000 |
| Loaded Strip | 3,950 | 56,400 | |

Based on assumed daily feed of 909.8 tonnes (1003 tons) of concentrate to chlorination roasting and assuming 95% overall recovery in the chlorination-leaching-purification stages, the production would be 259.2 tonnes (285.8 tons) of zinc per day. For a 350 day operation, this is equivalent to 90,703 tonnes (100,000 tons) of zinc annually, corresponding to an hourly solution feed to solvent extraction of 6013 L/min (1323 gal/min) based on a leach solution feed, in g/L, of 30 Zn, 0.4 Cu, 0.4 Pb, 0.002 Fe, in 3.0 M NaCl at pH 4.0. These rates and concentrations were used in the sizing of the circuits.

COPPER CIRCUIT

Extraction of copper is shown in FIG. 2 in 4 stages of mixer-settlers, using 5% Acorga P5300 in an aliphatic kerosene diluent such as Shellsol LX 154 (trademark). At an A/O ratio of 3.5/1, 6013 L/min aqueous (1323 gal/min) and 1718 L/min solvent (378 gal/min), the solvent will load to 1.4 g Cu/L. The retention time in the mixer is 0.5 min. Following extraction, the solvent is scrubbed with water in 6 stages, at an O/A ratio of 5, to remove chloride from the solvent. The mixing time is 1 min. The copper is recovered from the solvent by stripping in 3 stages with return electrolyte from electrowinning, containing 30 g Cu/L and 150 g $H_2SO_4$/L, at an O/A ratio of 6 and with a retention time in the mixer of 1 min. Sulphate remaining on the solvent after stripping is removed in 3 stages of water scrubbing at an O/A of 8 for 1 min, and the solvent recycled. All settlers were designed on a basis of 73.4 L/min/m² (1.5 gal/min/ft²) settler area.

ZINC CIRCUIT

Zinc extraction is shown in FIG. 3 in 6 stages at an O/A ratio of 2.2 and a flow of 13,225 L/min (2910 gal/min) of 60% TBP in Shell Solvesso 150 (trademark) aromatic diluent. A retention time of 1.8 minutes is used in the mixer. The solvent is scrubbed in 3 stages at an O/A of 3, for 1 minute, with a solution consisting of 25 g $ZnCl_2$/L in 3 M NaCl. Zinc is recovered from the solvent by 6 stages of stripping using return electrolyte containing 15 g Zn/L at pH 1.0 in HCl at an O/A of 2.5 for 1.8 minutes. Prior to recycling the stripped solvent to extraction, the solvent is acid equilibrated with 50 g HCl/L at an O/A of 5 for 1.8 minutes.

We claim:

1. A process for separating and recovering copper and zinc from aqueous chloride solutions containing lead, copper, zinc and impurities, comprising:
   (a) separating lead from the aqueous chloride solution by at least one of crystallization, precipitation, and solvent extraction;
   (b) solvent extracting the resulting aqueous solution with a first water-immiscible organic liquid comprising a copper-chelating extractant reagent to load copper into the organic phase;
   (c) scrubbing the Cu-loaded organic phase with at least one aqueous liquid selected from water and $Na_2SO_4$ solution to remove impurities;

(d) stripping the Cu from this first organic phase with aqueous CuSO$_4$-H$_4$SO$_4$ solution and passing the Cu-containing sulphate strip solution to a Cu electrowinning stage;

(e) scrubbing this stripped organic phase with water to remove sulphate, and recycling this organic liquid to extraction stage (b);

(f) solvent extracting the remaining aqueous chloride solution with a second water-immiscible organic liquid comprising tributylphosphate to load zinc thereon;

(g) scrubbing the Zn-loaded organic phase with aqueous ZnCl$_2$-NaCl solution to remove impurities;

(h) stripping the Zn from this second organic phase with aqueous ZnCl$_2$-HCl solution and passing the Zn-containing chloride strip solution to a Zn electrowinning stage; and (i) separating impurities from the residual aqueous phase sufficiently to avoid detrimental build-up thereof, and recovering chloride solution for recycle.

2. The process of claim 1 wherein the copper-chelating extractant is a salicylaldoxime.

3. The process of claim 2 wherein the salicylaldoxime extractant reagent includes the following: a nonyl salicylaldoxime anti-isomer, and p-nonylphenol.

4. The process of claim 1 wherein the feed chloride solution is a brine leach liquor.

5. The process of claim 4 wherein the leach liquor is obtained on chlorination roast-leach of complex galena-sphalerite-chalcopyrite ores or concentrates.

6. The process of claim 1 wherein a solution of aqueous CuSO$_4$ and H$_2$SO$_4$ containing about 25 to 35 g Cu/L and about 120 to 180 g H$_2$SO$_4$/L is used for stripping in (d).

7. The process of claim 1 wherein an aqueous solution of ZnCl$_2$ and NaCl containing about 15 to 40 g Zn/L and about 120 to 200 g NaCl/L is used for scrubbing in (g).

8. The process of claim 1 wherein a solution of aqueous ZnCl$_2$ and HCl containing about 10 to 20 g Zn/L and about 10 to 20 g HCl/L is used for stripping in (h).

9. The process of claim 1 wherein the strip solutions in (d) and (h) are return electrolytes from the respective Cu and Zn electrowinning stages.

10. The process of claim 1 wherein a bleed stream of the residual aqueous phase in (i) is subject to purification to control build-up of cations and anions other than chloride before recycle.

11. The process of claim 1 wherein the recovered chloride solution from (i) is recycled to the leach of oxidized calcine derived from a low temperature chlorination roast of Cu-Pb-Zn sulphide ores or concentrates.

12. The process of claim 1 wherein the chloride feed solution comprises
Cu in from about 0.1 to about 2 g/L
Pb in from about 6 to about 10 g/L
and Zn in from about 20 to about 40 g/L.

13. The process of claim 12 wherein the chloride feed solution is formed by a brine leach of a chlorination-oxidation roast calcine from a complex sulphide mineral.

14. The process of claim 1 wherein in step (a) the lead is separated by crystallization as PbCl$_2$, the crystals dissolved, and lead electrowon.

15. The process of claim 1 wherein the Zn-containing chloride strip solution is mixed with a soluble deposit-levelling additive and the mixture fed as catholyte directly to an electrolysis stage and zinc electrowon under catholyte agitation conditions.

16. The process of claim 1 wherein the second organic phase, following stripping in (h), is recycled to extraction stage (f).

* * * * *